(12) United States Patent
Bohling et al.

(10) Patent No.: US 9,346,972 B2
(45) Date of Patent: May 24, 2016

(54) PIGMENTED COATING COMPOSITION WITH A PHOSPHORUS ACID FUNCTIONALIZED BINDER

(71) Applicant: Rohm and Haas Company, Philadelphia, PA (US)

(72) Inventors: James C. Bohling, Lansdale, PA (US); Jonathan DeRocher, Coopersburg, PA (US); Kevin J. Henderson, Phoenixville, PA (US); Antony K. Van Dyk, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/565,920

(22) Filed: Dec. 10, 2014

(65) Prior Publication Data

US 2015/0175832 A1     Jun. 25, 2015

Related U.S. Application Data

(60) Provisional application No. 61/918,705, filed on Dec. 20, 2013.

(51) Int. Cl.
| | |
|---|---|
| *C09D 133/08* | (2006.01) |
| *C08J 3/20* | (2006.01) |
| *C09D 5/02* | (2006.01) |

(52) U.S. Cl.
CPC ............... *C09D 133/08* (2013.01); *C08J 3/203* (2013.01); *C09D 5/02* (2013.01); *C09D 5/027* (2013.01); *C08J 2333/08* (2013.01); *C08J 2481/08* (2013.01)

(58) Field of Classification Search
CPC ........ C09D 133/08; C09D 5/02; C09D 5/027; C08J 3/203; C08J 2333/08; C08J 2481/08; C08K 9/04

USPC .................................................. 524/431, 521
See application file for complete search history.

(56) References Cited

U.S. PATENT DOCUMENTS

| | | | |
|---|---|---|---|
| 7,078,457 B2 * | 7/2006 | Amick ...................... | C08F 4/34 524/556 |
| 7,459,496 B2 * | 12/2008 | Hsu .......................... | C08F 2/24 524/439 |
| 2003/0018103 A1 | 1/2003 | Bardman et al. | |
| 2004/0054063 A1 | 3/2004 | Brown et al. | |
| 2008/0146724 A1 | 6/2008 | Bohling et al. | |
| 2012/0058278 A1 | 3/2012 | Bohling et al. | |

FOREIGN PATENT DOCUMENTS

| | | |
|---|---|---|
| WO | 2008119887 A1 | 10/2008 |
| WO | 2013096162 A1 | 6/2013 |
| WO | 2013163808 A1 | 11/2013 |

* cited by examiner

*Primary Examiner* — Michael M Bernshteyn
(74) *Attorney, Agent, or Firm* — Reid S. Willis

(57) ABSTRACT

The present invention is a composition comprising a) a stable aqueous dispersion of polymer particles functionalized with structural units of a phosphorus acid monomer or a salt thereof and; b) a water-soluble polymer functionalized with structural units of a sulfonic acid monomer or a salt thereof as well as a method comprising mixing the stable aqueous dispersion of the phosphorus acid functionalized polymer particles with the sulfonic acid functionalized polymer, and $TiO_2$. The composition of the present invention is useful as a coatings formulation that provides improved hiding over phosphorus acid functionalized binders that do not include the water-soluble polymer. Alternatively, the same hiding benefit is seen at lower phosphorus acid concentration when the sulfonic acid functionalized polymer is present.

9 Claims, No Drawings

PIGMENTED COATING COMPOSITION WITH A PHOSPHORUS ACID FUNCTIONALIZED BINDER

BACKGROUND OF THE INVENTION

The present invention relates to improving hiding efficiency in pigmented paints using a phosphorus acid functionalized latex binder in combination with a water-soluble polymer containing sulfonic acid groups or salts thereof.

The efficacy of the $TiO_2$ as a hiding pigment is reduced when $TiO_2$ particles are allowed to come too close together on film formation and drying. It is known that the spacing of $TiO_2$ and its concomitant hiding efficiency can be improved with the aid of emulsion polymer particles adsorbed to the $TiO_2$ particle surface, as disclosed in US 2003/0018103. One of the problems observed with current adsorbing latex (pre-composite) technology, particularly latexes prepared using highly reactive phosphorus acid functional monomers such as phosphoethylmethacrylate (PEM), is formation of grit arising from the uncontrolled reaction of the reactive pre-composite with $TiO_2$. Accordingly, a formulator must carefully mix the adsorptive latex with the pigment under controlled conditions to avoid flocculation, or decrease the level of reactive functional monomers, which decreases hiding efficiency. Additionally, the use of phosphorus acid monomers can be prohibitively expensive for some applications or can compromise viscosity stability of paint or dried film performance properties such as water sensitivity or scrub resistance. Furthermore, from a synthetic standpoint, a phosphorus acid monomer can adversely affect emulsion stability and seeding efficiency within emulsion polymerizations; moreover, this acidic monomer also lowers the pH of the process, thereby requiring subsequent neutralization, which lowers the potential volume solids of consequent latex. It would therefore be desirable to discover a way to decrease the concentration of phosphorus acid monomer in a pre-composite without compromising hiding efficiency, or alternatively to improve the hiding efficiency within a pre-composite without needing to increase the phosphorus acid monomer concentration.

SUMMARY OF THE INVENTION

In a first aspect, the present invention addresses a need in the art by providing a process for preparing a coatings composition comprising the steps of contacting: a) an aqueous solution of a water-soluble polymer functionalized with structural units of a sulfonic acid monomer or a salt thereof; b) a stable aqueous dispersion of polymer particles functionalized with structural units of a phosphorus acid monomer or a salt thereof; and c) $TiO_2$;

wherein the weight percent of the sulfonic acid functionalized polymer is from 0.1 to 10 percent, based on the weights of the sulfonic acid functionalized and the phosphorus acid functionalized polymer particles;

wherein the weight percent of the phosphorus acid functionalized polymer particles is from 20 to 80%, based on the weight of the sulfonic acid functionalized and the phosphorus acid functionalized polymer particles, and the $TiO_2$;

wherein the weight percent of the $TiO_2$ is from 20 to 80% based on the weight of the sulfonic acid functionalized polymer, the phosphorus acid functionalized polymer particles, and the $TiO_2$; and wherein the weight percent of structural units of the phosphorus acid monomer or a salt thereof is from 0.1 to 5 weight percent, based on the weight of the phosphorus acid functionalized polymer particles.

In a second aspect, the present invention is a composition comprising a) a stable aqueous dispersion of polymer particles functionalized with structural units of a phosphorus acid monomer or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the phosphorus acid functionalized polymer particles and sulfonic acid functionalized polymer; and the weight percent of the phosphorus acid functionalized polymer particles is from 90 to 99.9 weight percent; wherein the weight percent of structural units of the phosphorus acid monomer or a salt thereof is from 0.1 to 5 weight percent, based on the weight of the phosphorus acid functionalized polymer particles.

The present invention provides a way of improving stability in paint formulations with a binder functionalized with phosphorus acid.

DETAILED DESCRIPTION OF THE INVENTION

In a first aspect, the present invention a process for preparing a coatings composition comprising the steps of contacting: a) an aqueous solution of a water-soluble polymer functionalized with structural units of a sulfonic acid monomer or a salt thereof; b) a stable aqueous dispersion of polymer particles functionalized with structural units of a phosphorus acid monomer or a salt thereof; and c) $TiO_2$;

wherein the weight percent of the sulfonic acid functionalized polymer is from 0.1 to 10 percent, based on the weights of the sulfonic acid functionalized and the phosphorus acid functionalized polymer particles;

wherein the weight percent of the phosphorus acid functionalized polymer particles is from 20 to 80%, based on the weight of the sulfonic acid functionalized and the phosphorus acid functionalized polymer particles, and the $TiO_2$;

wherein the weight percent of the $TiO_2$ is from 20 to 80% based on the weight of the sulfonic acid functionalized polymer, the phosphorus acid functionalized polymer particles, and the $TiO_2$; and wherein the weight percent of structural units of the phosphorus acid monomer or a salt thereof is from 0.1 to 5 weight percent, based on the weight of the phosphorus acid functionalized polymer particles.

As used herein, the term "phosphorus acid monomer" refers to a polymerizable compound containing at least one phosphorus atom and having at least one acidic proton. Examples of suitable classes of phosphorus acid monomers include phosphonic acid monomers and salts thereof and dihydrogen phosphate esters of an alcohol in which the alcohol contains or is substituted with a polymerizable vinyl or olefinic group, and salts thereof. Preferred dihydrogen phosphate esters are phosphates of hydroxyalkyl(meth)acrylates, including phosphoethyl methacrylate and phosphopropyl methacrylates, with phosphoethyl methacrylate and salts thereof being especially preferred.

An example of a suitable phosphonic acid is 2-(methacryloyloxy)ethyl phosphonic acid or a salt thereof.

As used herein, the term "structural units" refers to the groups formed upon the polymerization of the recited monomer. A structural unit of a phosphoethylmethacrylate is illustrated:

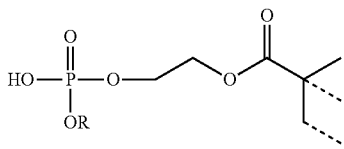

wherein the dotted lines represent the points of connectivity to the polymer backbone;
wherein R is H or

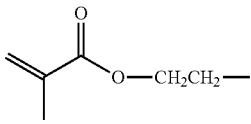

The polymer functionalized with structural units of a sulfonic acid monomer or a salt thereof (the sulfonic acid functionalized polymer) is a water-soluble polymer that may be a homopolymer or a copolymer and preferably comprises at least 20, and more preferably at least 50 weight percent, to 100, more preferably to 95, more preferably to 80 weight percent structural units of a sulfonic acid monomer or a salt thereof, based on the weight of the sulfonic acid monomer. Examples of suitable sulfonic acid monomers include 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof, and combinations thereof. A particularly preferred sulfonic acid monomer is 2-acrylamido-2-methylpropane sulfonic acid (AMPS) or a salt thereof.

The sulfonic acid functionalized polymer may further comprise structural units of another monomer, examples of which include acrylates and methacrylates such as methyl methacrylate, ethyl acrylate, butyl acrylate, ethyl hexyl acrylate, hydroxyethyl methacrylate and hydroxypropyl acrylates; dialkylaminoalkyl acrylates and methacrylates including 2-(N,N-dimethylamino)ethyl methacrylate (DMAEMA), 2-(N,N-dimethylamino)ethyl acrylate, 2-(N,N-diethylamino)ethyl methacrylate, 2-(N,N-diethylamino)ethyl acrylate 2-(t-butylamino)ethyl methacrylate, 3-(dimethylamino) propyl acrylate, 2-diisopropylaminoethyl methacrylate, and 3-dimethylaminoneopentyl acrylate; polyalkylene glycol acrylates and methacrylates including poly(ethylene glycol) methacrylate, poly(ethylene glycol) acrylate, and lauryl-O—($CH_2CH_2O)_{23}$-methacrylate; dialkylaminoalkyl acrylamides and methacrylamides including N-[2(N,N-dimethylaminoethyl]methacrylamide, N-[3-(N,N-dimethylamino)propyl]acrylamide, and N-[3-(N,N-dimethylamino)propyl]methacrylamide; acrylamidotrialkylammonium halides including [2-(acryloxy)ethyl]trimethylammonium chloride, [2-(methacryloxy)ethyl]trimethylammonium chloride, and (3-methacrylamidopropyl)trimethylammonium chloride.

An example of a preferred sulfonic acid functionalized polymer comprises from 5 weight percent, to 80, more preferably to 50 weight percent structural units of another monomer such as 2-hydroxylpropyl acrylate, methyl methacrylate, or DMAEMA.

While it is permissible for the sulfonic acid functionalized polymer to comprise structural units of methyacrylic acid or acrylic acid, it is preferred that this polymer comprise less than 5.0, more preferably less than 1, and most preferably less than 0.1 weight percent than these monocarboxylic acid functionalized monomers.

The sulfonic acid functionalized polymer preferably has a weight average molecular weight ($M_w$) in the range of 1000 to 25,000 Daltons. Preferably, the weight percent of the sulfonic acid functionalized polymer is from 0.4 weight percent to 8 weight percent, more preferably to 4 weight percent, based on the weight of the sulfonic acid functionalized polymer and the phosphorus acid functionalized polymer particles.

The stable aqueous dispersion of polymer particles functionalized with structural units of the phosphorus acid monomer or a salt thereof are preferably acrylic, styrene-acrylic, or vinyl ester-acrylic (more particularly vinyl acetate-acrylic) latex binders, and the polymer particles preferably further comprise structural units of one or more of the following monomers: methyl methacrylate, butyl acrylate, ethyl acrylate, 2-ethylhexyl acrylate, ureido methacrylate, styrene, vinyl acetate, and vinyl versatate. The phosphorus acid functionalized polymer may also include structural units of other monomers such as allyl methacrylate, divinyl benzene, acrylamide, and acetoacetoxyethyl methacrylate.

The weight percent of the phosphorus acid monomer is preferably from 0.2 weight percent to 4, more preferably to 2, and most preferably to 1.5 weight percent, based on the weight of the phosphorus acid monomer functionalized polymer particles.

The $TiO_2$ is preferably provided as an aqueous slurry stabilized by a pigment dispersant such as a homopolymer and a copolymer of an acid functionalized monomer, such as a carboxylic acid functionalized monomer including acrylic acid, methacrylic acid, and maleic acid, or combinations thereof. Commercial examples of pigment dispersants include TAMOL™ 945 Dispersant, TAMOL™ 1124 Dispersant, and TAMOL™ 731A Dispersant. (TAMOL is a Trademark of The Dow Chemical Company or its Affiliates).

In a second aspect, the present invention is a composition comprising a) a stable aqueous dispersion of polymer particles functionalized with structural units of a phosphorus acid monomer or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the phosphorus acid functionalized polymer particles and sulfonic acid functionalized polymer; and the weight percent of the phosphorus acid functionalized polymer particles is from 90 to 99.9 weight percent; wherein the weight percent of structural units of phosphorus acid monomer or a salt thereof is from 0.1 to 5 weight percent, based on the weight of the phosphorus acid functionalized polymer particles.

The composition may further include from 20 to 80 weight percent $TiO_2$ based on the weight of the phosphorus acid functionalized polymer particles and the water-soluble polymer. Though not bound by theory, it is believed that the water-soluble polymer promotes adsorption of phosphorus acid functionalized polymer particles onto the $TiO_2$ particles.

The coatings composition further includes one or more of the following materials: rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

EXAMPLES

Abbreviations

Phosphoethylmethacrylate PEM
2-Acrylamido-2-methylpropane sulfonic acid AMPS
2-Hydroxypropyl Acrylate HPA
n-Butyl Acrylate BA
Methyl Methacrylate MMA
Ureido Methacrylate UMA
Acrylic Acid AA
Methacrylic Acid MAA
Ammonium Persulfate APS
t-Butyl Hydroperoxide t-BHP
Isoascorbic Acid IAA
Ethylenediaminetetraacetic acid, tetrasodium salt EDTA In the following examples, ACRYSOL™, TERGITOL™, and TAMOL™ are all Trademarks of The Dow Chemical Company or Its Affiliates.

Examples

Example 1

0.5% PEM (60% Active) Binder with 2.5% AMPS-HPA

A. Preparation of Binder

A stage 1 monomer emulsion (ME1) was prepared by mixing DI water (157.6 g), sodium laureth sulfate (26.0 g, 31% active), BA (253.9 g), MMA (216.0 g), MAA (14.5 g), and PEM (8.5 g, 60% active). A stage 2 monomer emulsion (ME2) was prepared by mixing DI water (305.5 g), sodium laureth sulfate (36.0 g, 31% active), BA (579.5 g), MMA (560.8 g), and MAA (9.5 g). DI water (796.3 g) and sodium laureth sulfate (5.0 g, 31% active) was added to a 5-L, four-necked round bottom flask equipped with a paddle stirrer, a thermocouple, nitrogen inlet, and reflux condenser, and stirring was initiated. The contents of the flask were heated to 85° C. under a nitrogen atmosphere. A portion of ME1 (100.0 g) was added to the kettle followed by a DI water rinse (40 g). The contents of the flask were stirred for 1 min, whereupon a solution of NaPS (3.5 g) in DI water (10 g) was added, followed by a DI water rinse (10 g). After another 5 min, the remainder of ME1 was added to the flask over 30 min. Concurrently, a solution of NaPS (3.3 g) in DI water (72.0 g) was fed separately to the flask at a rate of 0.7 g/min. After completion of ME1 feed, DI water (20 g) was added as a rinse and ammonia (12.40 g, 30% aqueous) in DI water (10 g) was added to the co-feed. ME2 was then added to the flask over 90 min, along with separate addition of UMA (50% aqueous solution, 44.10 g) and benzophenone (21.30 g of a 40% solution in BA). After completion of ME2 feed addition, DI water (85 g) was added as a rinse. The contents of the flask were maintained at 85-87° C. during the additions. A solution of iron sulfate heptahydrate (0.02 g) and EDTA (0.02 g) in DI water (21.8 g) was then added along with a DI water rinse (10 g). The batch was then cooled to 30° C. while a redox pair was added to the kettle to reduce residual monomer level. After the redox pair addition, an aqueous solution of ammonia (9.80 g, 28% aqueous) in DI water (30 g) was added at a temperature less than 40° C., followed by addition of biocide. The particle size was found to be 98 nm, solids content 48.5%, and pH 8.8.

B. Paint Formulation

A water-soluble sulfonic acid functionalized polymer (63% AMPS/35% HPA/2% AA by weight, 4.84 g, 31% solids, 2.5 weight percent based on the weights of binder and the water-soluble polymer, $M_w$=5900 g/mol; $M_n$=1500 g/mol, hereinafter AMPS-HPA) and DI water (5.68 g) were added to PEM binder (49.48 g) in a pint-sized plastic container with mixing at ~350 rpm; Ti Pure R-746 $TiO_2$ (49.06 g) was then added and mixing was continued 10 min. Following this initial mixing, additional binder (67.56 g), Texanol coalescent (4.46 g), ACRYSOL™ RM-2020 NPR Rheology Modifier (4.49 g), ACRYSOL™ RM-825 Rheology Modifier (0.11 g), TERGITOL™ 15-S-9 Surfactant (0.80 g), and water (14.84 g) were added and stirring was continued for an additional 10 min at 1200 rpm.

Example 2

1% PEM Binder with 1.3% Added AMPS-HPA

A. Preparation of Binder

The binder was prepared substantially as described in Example 1 except that about double the amount of PEM (16.9 g) and a reduced amount of MAA (11.0 g) was used in the preparation of ME1. The particle size was found to be 96 nm and solids of 49.0% with a pH of 8.4.

B. Paint Formulation

The AMPS-HPA (2.42 g) and DI water (8.60 g) were added to the PEM-functionalized binder (48.98 g) in a pint sized plastic container with mixing at ~350 rpm; Ti Pure R-746 $TiO_2$ (49.06 g) was then added and mixing was continued 10 min. Following this initial mixing, additional binder (66.87 g), Texanol coalescent (4.46 g), ACRYSOL™ RM-2020 NPR Rheology Modifier (4.49 g), ACRYSOL™ RM-825 Rheology Modifier (0.11 g), TERGITOL™ 15-S-9 Surfactant (0.80 g), and water (15.53 g) were added and stirring was continued for an additional 10 min at 1200 rpm.

Comparative Example 1

2% PEM (60% Active) Binder with No Additive

A. Preparation of Binder

A stage 1 monomer emulsion (ME1) was prepared by mixing DI water (157.6 g), sodium laureth sulfate (26.0 g, 31% active), BA (253.9 g), MMA (216.0 g), MAA (4.1 g), and PEM (33.8 g, 60% active). A stage 2 monomer emulsion (ME2) was prepared by mixing DI water (305.5 g), sodium laureth sulfate (36.0 g, 31% active), BA (579.5 g), MMA (560.8 g), and MAA (9.5 g). DI water (796.3 g) and sodium laureth sulfate (5.0 g, 31% active) was added to a 5-L, four-necked round bottom flask equipped with a paddle stirrer, a thermocouple, nitrogen inlet, and reflux condenser, and stirring was initiated. The contents of the flask were heated to 85° C. under a nitrogen atmosphere. A portion of ME1 (100.0 g) was added to the kettle followed by a DI water rinse (40 g). The contents of the flask were stirred for 1 min, whereupon a solution of NaPS (3.5 g) in DI water (10 g) was added, followed by a DI water rinse (10 g). After another 5 min, the remainder of ME1 was added to the flask over 30 min. Concurrently, a solution of NaPS (3.3 g) in DI water (72.0 g) was fed separately to the flask at a rate of 0.7 g/min. After completion of ME1 feed, DI water (20 g) was added as a rinse and ammonia (12.40 g, 30% aqueous) in DI water (10 g) was added to the co-feed. ME2 was then added to the flask over 90 min, along with separate addition of UMA (50% aqueous solution, 44.10 g) and benzophenone (21.30 g of a 40% in BA). After completion of ME2 feed addition, DI water (85 g) was added as a rinse. The contents of the flask were maintained at 85-87° C. during the additions. A solution of iron sulfate heptahydrate (0.02 g) and EDTA (0.02 g) in DI water (21.8 g) was then added along with a DI water rinse (10 g). The batch was then cooled to 30° C. while a redox pair was added to the kettle to reduce residual monomer level. After the redox pair addition, an aqueous solution of ammonia (16.0 g, 28% aqueous) in DI water (30 g) was added at a temperature less than 40° C., followed by addition of biocide. The particle size was found to be 91 nm, solids content 48.5%, and pH 8.3.

B. Paint Formulation

DI water (12.0 g) was added to the PEM binder (48.0 g) in a pint-sized plastic container with mixing at ~350 rpm; Ti Pure R-746 TiO$_2$ (49.06 g) was then added and mixing was continued 10 min. Following this initial mixing, additional binder (65.53 g), Texanol coalescent (4.46 g), ACRYSOL™ RM-2020 NPR Rheology Modifier (4.49 g), ACRYSOL™ RM-825 Rheology Modifier (0.11 g), TERGITOL™ 15-S-9 Surfactant (0.80 g), and water (16.87 g) were added and stirring was continued for an additional 10 min at 1200 rpm.

Comparative 2

0.5% PEM (60% Active)_Binder with No Added AMPS-HPA

A. Preparation of Binder

The binder was prepared as described for Example 1.

B. Paint Formulation

The paint was formulated as described for Comparative Example 1, but using the 0.5% PEM binder.

Comparative 3

1% PEM (60% Active)_Binder with No Added Additive

A. Preparation of Binder

The binder was prepared as described for Example 2.

B. Paint Formulation

The paint was formulated as described for Comparative Example 1 and 2, but using the 1% PEM (60% Active)_Binder.

Kubelka-Munk S/mil Test Method:

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner Spectro-guide 45/0 Gloss Color spectrophotometer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \qquad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(\text{mils}) = \frac{W_{pf}(g) \times 1000(\text{mil/in})}{D(\text{lbs/gal}) \times 1.964(g/\text{in}^3/\text{lbs/gal}) \times A(\text{in})}$$

The hiding values for the described paints are shown in Table 1.

TABLE 1

Hiding values for example and comparative samples

| Example No. | Description | S/mil |
|---|---|---|
| Example 1 | 0.5% PEM binder with 2.5% added AMPS-HPA | 6.55 |
| Example 2 | 1% PEM binder with 1.3% added AMPS-HPA | 6.41 |
| Comparative 1 | 2% PEM binder with no added AMPS-HPA | 6.58 |
| Comparative 2 | 0.5% PEM binder with no added AMPS-HPA | 6.18 |
| Comparative 3 | 1% PEM binder with no added AMPS-HPA | 5.97 |

The baseline hiding for a paint made of 2% PEM and no added AMPS-HPA within the binder (Comparative 1) is 6.58 S/mil. The reduction of PEM to the binder by 1% and 1.5% drops the hiding by 0.4-0.6 S/mil (Comparatives 2 and 3). The addition of 2% AMPS-HPA (based on TiO$_2$) gives an increase of ~0.4 S/mil for the 1% PEM binder while a 4% addition to the 0.5% binder yield a similar improvement, with both giving approximately the same value for hiding as the original 2% PEM composition.

It has surprisingly been discovered that paints prepared using a combination of a phosphorus acid functionalized binder, the sulfonic acid functionalized polymer, and TiO$_2$ show improved hiding over phosphorus acid functionalized binders that do not include the water-soluble polymer. Alternatively, the same hiding benefit is seen at lower phosphorus acid concentration when the sulfonic acid functionalized polymer is present.

The invention claimed is:

1. A process for preparing a coatings composition comprising the steps of contacting: a) an aqueous solution of a water-soluble polymer functionalized with structural units of a sulfonic acid monomer or a salt thereof; b) a stable aqueous dispersion of polymer particles functionalized with structural units of a phosphorus acid monomer or a salt thereof; and c) TiO$_2$;

wherein the weight percent of the sulfonic acid functionalized polymer is from 0.1 to 10 percent, based on the weights of the sulfonic acid functionalized and the phosphorus acid functionalized polymer particles;

wherein the weight percent of the phosphorus acid functionalized polymer particles is from 20 to 80%, based on the weight of the sulfonic acid functionalized and the phosphorus acid functionalized polymer particles, and the TiO$_2$;

wherein the weight percent of the TiO$_2$ is from 20 to 80% based on the weight of the sulfonic acid functionalized polymer, the phosphorus acid functionalized polymer particles, and the TiO$_2$; and wherein the weight percent of structural units of the phosphorus acid monomer or a salt thereof is from 0.1 to 5 weight percent, based on the weight of the phosphorus acid functionalized polymer particles.

2. The process of claim 1 wherein the stable aqueous dispersion of the phosphorus acid functionalized polymer particles are acrylic, styrene-acrylic, or vinyl ester-acrylic latex binders;

wherein weight percent of the sulfonic acid functionalized polymer is from 0.4 to 8 weight percent, based on the weight of the sulfonic acid functionalized polymer and the phosphorus acid functionalized polymer particles; and wherein the sulfonic acid functionalized polymer or salt thereof is functionalized with structural units of a sulfonic acid monomer selected from the group consisting of 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof.

3. The process of claim 2 wherein the sulfonic acid monomer or salt thereof is 2-acrylamido-2-methylpropane sulfonic acid or a salt thereof, wherein the phosphorus acid functionalized polymer particles further comprise structural units of one or more monomers selected from the group consisting of methyl methacrylate, butyl acrylate, ethyl acrylate, 2-ethylhexyl acrylate, ureido methacrylate, styrene, vinyl acetate, and vinyl versatate;

wherein the weight percent of structural units of the phosphorus acid monomer or a salt thereof is from 0.2 to 4 weight percent, based on the weight of the phosphorus acid monomer functionalized polymer particles;

wherein the weight percent of the sulfonic acid functionalized polymer is from 0.4 to 4 weight percent, based on the weight of the sulfonic acid functionalized polymer and the itaconic acid functionalized polymer particles.

4. The process of claim 3 wherein the sulfonic acid functionalized polymer further comprises structural units of another monomer selected from the group consisting of acrylates, methacrylates, dialkylaminoalkyl acrylates, and dialkylaminoalkyl methacrylates.

5. The process of claim 4 wherein sulfonic acid functionalized polymer is a homopolymer of 2-acrylamido-2-methylpropane sulfonic acid or a salt thereof; or a copolymer comprising from 50 to 95 weight percent structural units of 2-acrylamido-2-methylpropane sulfonic acid or a salt thereof and from 5 to 50 weight percent structural units of 2-hydroxylpropyl acrylate, based on the weight of the 2-acrylamido-2-methylpropane sulfonic acid and the 2-hydroxylpropyl acrylate; wherein the weight percent of structural units of the phosphorus acid monomer or a salt thereof is from 0.2 to 1.5 weight percent, based on the weight of the phosphorus acid monomer functionalized polymer particles.

6. The process of claim 1 which further includes the step of mixing with the coatings composition one or more materials selected from the groups consisting of rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

7. A composition comprising a) a stable aqueous dispersion of polymer particles functionalized with structural units of a phosphorus acid monomer or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the phosphorus acid functionalized polymer particles and sulfonic acid functionalized polymer; and the weight percent of the phosphorus acid functionalized polymer particles is from 90 to 99.9 weight percent; wherein the weight percent of structural units of phosphorus acid monomer or a salt thereof is from 0.1 to 5 weight percent, based on the weight of the phosphorus acid functionalized polymer particles.

8. The composition of claim 7 which further comprises from 20 to 80 weight percent $TiO_2$ based on the weight of the phosphorus acid functionalized polymer particles and the water-soluble polymer; wherein the weight percent of structural units of phosphorus acid monomer or a salt thereof is from 0.2 to 1.5 weight percent, based on the weight of the phosphorus acid functionalized polymer particles.

9. The composition of claim 8 which further comprises one or more materials selected from the groups consisting of rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

* * * * *